US010670037B2

(12) United States Patent
Wadia et al.

(10) Patent No.: US 10,670,037 B2
(45) Date of Patent: Jun. 2, 2020

(54) TURBOFAN ENGINE'S FAN BLADE AND SETTING METHOD THEREOF

(71) Applicant: General Electric Company, Schenectady, NY (US)

(72) Inventors: Aspi Rustom Wadia, Evendale, OH (US); Deepak Manohar Kamath, Evendale, OH (US); Daniel Waslo, Lynn, MA (US)

(73) Assignee: General Electric Company, Schenectady, NY (US)

( * ) Notice: Subject to any disclaimer, the term of this patent is extended or adjusted under 35 U.S.C. 154(b) by 70 days.

(21) Appl. No.: 15/819,215

(22) Filed: Nov. 21, 2017

(65) Prior Publication Data

US 2019/0154055 A1    May 23, 2019

(51) Int. Cl.
| | |
|---|---|
| *F04D 29/32* | (2006.01) |
| *F04D 29/02* | (2006.01) |
| *B64C 11/14* | (2006.01) |
| *F01D 5/14* | (2006.01) |
| *F02K 3/06* | (2006.01) |

(52) U.S. Cl.
CPC ............ *F04D 29/322* (2013.01); *B64C 11/14* (2013.01); *F01D 5/146* (2013.01); *F04D 29/023* (2013.01); *F04D 29/324* (2013.01); *F02K 3/06* (2013.01); *F05D 2220/36* (2013.01); *F05D 2240/30* (2013.01); *F05D 2300/174* (2013.01)

(58) Field of Classification Search
CPC ........ F02K 3/06; F04D 29/322; F04D 29/023; F04D 29/324; F01D 5/142; F01D 5/143; F01D 5/146; F05D 2220/36; F05D 2240/30; F05D 2300/174; B64C 11/14

USPC .......................................... 416/200 A, 245 R
See application file for complete search history.

(56) References Cited

U.S. PATENT DOCUMENTS

| | | | | |
|---|---|---|---|---|
| 1,779,186 A | * | 10/1930 | Pavlecka ............... | B64D 33/08 416/94 |
| 1,824,667 A | * | 9/1931 | Grumpelt ............... | B64C 11/00 416/175 |
| 2,260,786 A | * | 10/1941 | Muhlenbruck ......... | B64C 11/00 416/201 R |
| 2,755,868 A | * | 7/1956 | Smith ..................... | B64C 11/14 416/234 |
| 3,059,834 A | * | 10/1962 | Hausammann ......... | F04D 21/00 416/237 |

(Continued)

FOREIGN PATENT DOCUMENTS

| | | | | |
|---|---|---|---|---|
| FR | 22249 E | * | 5/1921 | ............ B64C 11/14 |
| GB | 228343 A | * | 2/1925 | ............ B63H 23/34 |

OTHER PUBLICATIONS

Takeshi Murooka, Shinya Goto, Ikuhisa Mizuta, Hidekazu Kodama; IHI Corporation Design and Development of an Advanced Transonic Fan Rotor ISABE-2007-1136.

*Primary Examiner* — Moshe Wilensky
*Assistant Examiner* — Topaz L. Elliott
(74) *Attorney, Agent, or Firm* — Dority & Manning, P.A.

(57) ABSTRACT

A turbofan engine includes a compressor rotor, a plurality of main blades circumferentially mounted on the compressor rotor, and a plurality of spinner blades circumferentially mounted on the compressor rotor. Each of the spinner blades is located forward of a leading edge of a corresponding one of the main blades. Each of the spinner blades is circumferentially offset to the corresponding one of the main blades.

18 Claims, 4 Drawing Sheets

(56) References Cited

U.S. PATENT DOCUMENTS

| | | | |
|---|---|---|---|
| 3,703,081 A | 11/1972 | Krebs et al. | |
| 3,794,444 A * | 2/1974 | Campbell | F01D 25/02 416/201 R |
| 3,922,852 A * | 12/1975 | Drabek | F01D 7/00 60/226.1 |
| 3,993,415 A * | 11/1976 | Hauser | F01P 7/042 416/93 R |
| 5,152,661 A * | 10/1992 | Sheets | F01D 5/145 415/84 |
| 6,145,300 A * | 11/2000 | Romani | F01D 5/141 415/199.4 |
| 6,454,535 B1 * | 9/2002 | Goshorn | F01D 5/022 416/193 R |
| 6,722,847 B2 * | 4/2004 | Freeman | B64C 11/001 415/119 |
| 7,665,964 B2 | 2/2010 | Taylor et al. | |
| 7,721,526 B2 * | 5/2010 | Fujimura | F02K 3/06 416/245 R |
| 7,748,950 B2 * | 7/2010 | Kodama | F01D 5/021 415/143 |
| 7,980,054 B2 | 7/2011 | Suciu et al. | |
| 8,529,210 B2 * | 9/2013 | Merritt | F04D 29/286 416/223 B |
| 8,540,490 B2 * | 9/2013 | Ramakrishnan | F01D 5/146 416/1 |
| 8,616,854 B2 * | 12/2013 | Mahan | F01D 5/026 416/245 R |
| 8,689,442 B2 * | 4/2014 | Kappmeyer | B23H 9/10 29/889.23 |
| 8,689,538 B2 * | 4/2014 | Sankrithi | B64C 11/48 60/226.1 |
| 9,114,476 B2 * | 8/2015 | Gindorf | B23K 11/02 |
| 9,151,168 B2 * | 10/2015 | Jablonski | F01D 5/3007 |
| 9,297,257 B2 * | 3/2016 | Kray | F01D 5/02 |
| 9,303,520 B2 | 4/2016 | Hasting et al. | |
| 9,303,589 B2 * | 4/2016 | Heikurinen | F04D 29/023 |
| 9,541,092 B2 | 1/2017 | Norris et al. | |
| 9,874,221 B2 * | 1/2018 | DiPietro, Jr. | F04D 29/324 |
| 10,167,088 B2 * | 1/2019 | Clark | B64D 33/02 |
| 2004/0258522 A1 * | 12/2004 | Dix | F01D 5/066 416/94 |
| 2011/0192166 A1 | 8/2011 | Mulcaire | |
| 2013/0323065 A1 * | 12/2013 | Murooka | F01D 5/141 416/219 R |
| 2014/0133975 A1 | 5/2014 | Hasting et al. | |
| 2014/0363276 A1 | 12/2014 | Vanbuskirk | |
| 2015/0198174 A1 * | 7/2015 | Houle | F01D 5/3061 416/190 |
| 2016/0032734 A1 * | 2/2016 | Delapierre | F04D 29/322 60/200.1 |
| 2016/0108807 A1 * | 4/2016 | Schwarz | F02K 3/06 60/805 |
| 2017/0145837 A1 * | 5/2017 | Schloffer | B23K 20/1205 |
| 2018/0030894 A1 * | 2/2018 | Namgoong | F04D 27/002 |
| 2019/0106997 A1 * | 4/2019 | Chung | B23P 15/02 |

* cited by examiner

US 10,670,037 B2

TURBOFAN ENGINE'S FAN BLADE AND SETTING METHOD THEREOF

TECHNICAL FIELD

Embodiments of the subject matter described herein relate to turbofan engine fan blades and a method for setting turbofan engine fan blades.

BACKGROUND OF THE INVENTION

Modern turbofan engines usually comprise a fan rotor and one or more core rotors. Generally, in operation, the rotor blades in the fan rotor rotate about the shaft to compress a flow of air. The resulting supply of compressed air is then supplied to the core rotors when further compression occurs and then to the combustor where energy in the form of combusted fuel is added to the flow stream. The resulting flow of hot gases from the combustor is expanded through several sets of turbines, which causes the turbine rotor blades to rotate about the shaft. In this manner, the energy contained in the fuel is converted into the mechanical energy of the rotating blades, which may be used to rotate the rotor blades of the fan and/or the coils of a generator to generate electricity.

The ever-increasing demand for energy makes the objective of engineering more efficient turbofan engines an ongoing and significant one. Specifically, it's desired to improve the turbofan engine's overall pressure ratio (OPR) for better efficiency. Furthermore, it is also desired to reduce the booster stage count to get a more compact turbofan engine.

BRIEF DESCRIPTION OF THE INVENTION

In one embodiment, the invention relates to a turbofan engine, the turbofan engine comprising a fan rotor, a plurality of main blades, the main blades are circumferentially mounted on the fan rotor; a plurality of spinner blades, the spinner blades are circumferentially mounted on the fan rotor, the spinner blades are located forward to the leading edge of the main blade; each spinner blade is circumferentially offset to a corresponding main blade.

In another embodiment, the invention relates to a method for setting the turbofan engine's blade orientation, the method comprising: circumferentially mounting a plurality of main fan blades on the fan rotor; circumferentially mounting a plurality of spinner blades on the fan rotor, the spinner blades are located forward of the leading edge of the main fan blade; setting the plurality of main blades and the plurality of spinner blades to make each spinner blade circumferentially offset to a corresponding main blade.

BRIEF DESCRIPTION OF THE DRAWINGS

A more particular description of embodiments of the inventive subject matter briefly described above will be rendered by reference to specific embodiments thereof that are illustrated in the appended drawings. Understanding that these drawings depict only typical embodiments of the inventive subject matter and are not therefore to be considered to be limiting of its scope, embodiments of the inventive subject matter will be described and explained with additional specificity and detail through the use of the accompanying drawings in which.

DESCRIPTION OF EMBODIMENTS OF THE INVENTION

Figure 1:
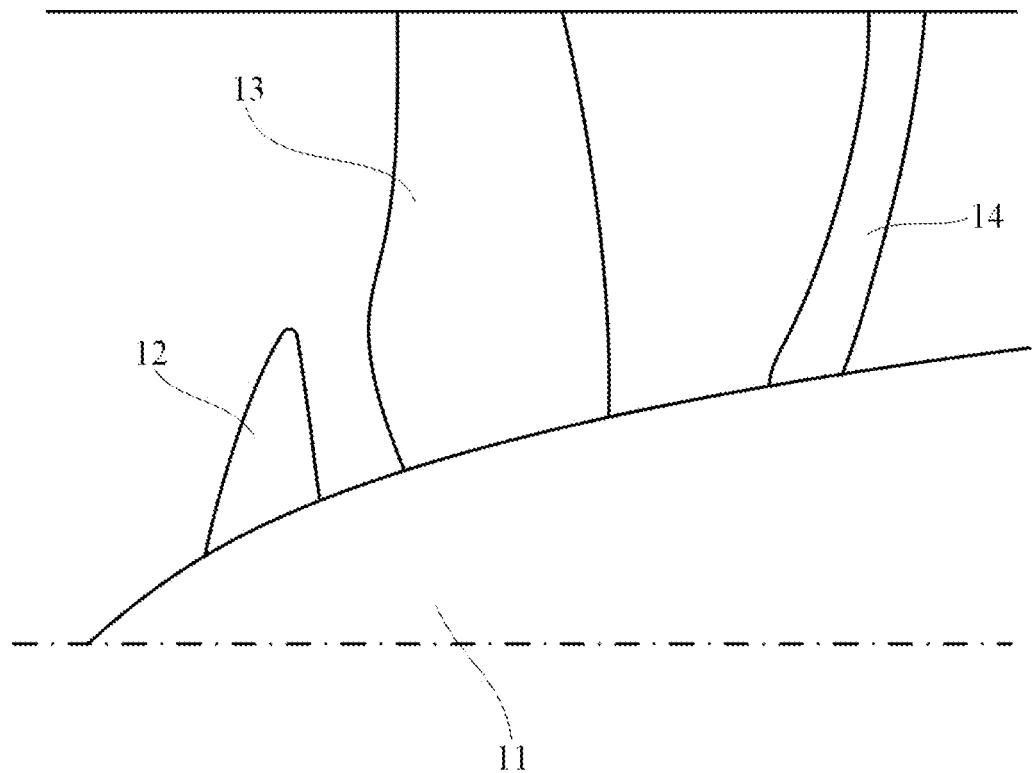
FIG. 1 is a schematic illustration of a spinner blade and a main blade according to one embodiment of the invention.

In the background and the following description, for the purposes of explanation, numerous specific details are set forth in order to provide a thorough understanding of the technology described herein. It will be evident to one skilled in the art, however, that the exemplary embodiments may be practiced without these specific details. In other instances, structures and devices are shown in diagram form in order to facilitate description of the exemplary embodiments.

The exemplary embodiments are described with reference to the drawings. These drawings illustrate certain details of specific embodiments that implement a module, method, or computer program product described herein. However, the drawings should not be construed as imposing any limitations that may be present in the drawings.

FIG. 1 schematically illustrates a compressor of a turbofan engine according to embodiments of the invention. The compressor comprising a rotor 11, a plurality of main blades 13 circumferentially mounted on the rotor 11, a plurality of spinner blades 12 circumferentially mounted on the rotor 11, and a plurality of outlet guide vanes 14 mounted on the rotor 11. The spinner blades 12 are located forward of the leading edge of the main blades 13, and the outlet guide vanes 14 are located aft of the main blades 13.

Figure 2:
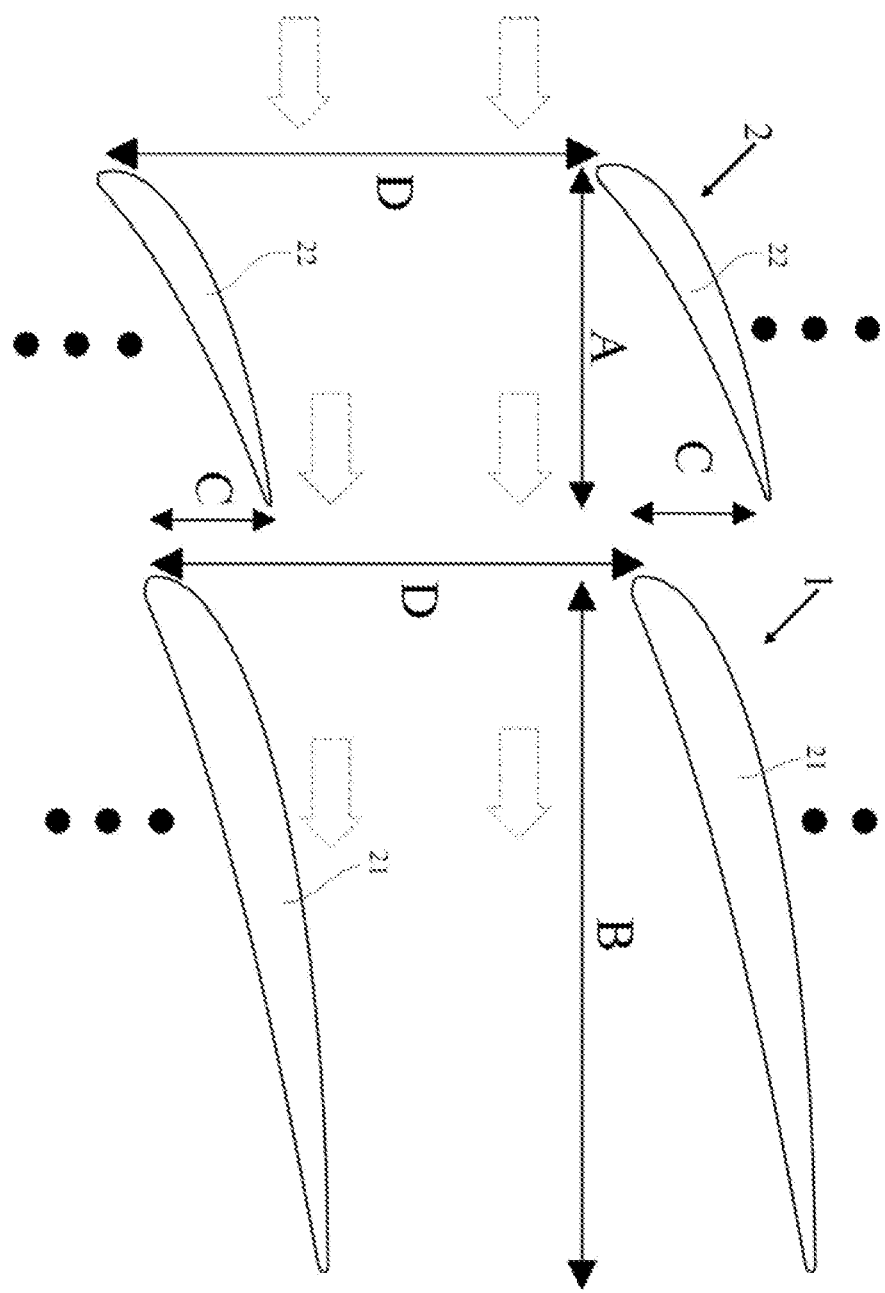
FIG. 2 is a schematic illustration of spinner blades and main blades according to one embodiment of the invention.

FIG. 2 schematically illustrates a setting pattern of main blades and spinner blades according to embodiments of the invention. As shown in FIG. 2, a turbofan engine compressor comprising a row of main blades 1 and a row of spinner blades 2. The main blades 21 are circumferentially spaced about the axis of the rotor and rotate about the shaft during operation. Similarly, the spinner blades 22 are circumferentially spaced about the axis of the rotor and rotate about the shaft during operation. As one skilled in the art will appreciate, the main blades 21 are configured such that, when spun about the shaft, they impart kinetic energy to the air or working fluid flowing through the compressor. The working fluid passageway is marked by dashed arrows in FIG. 2.

In embodiments of the invention, the radius ratio of the main blades 21 is set to 0.25-0.3. The term radius ratio refers to radius of the fan at the hub leading edge to the radius of the fan at the blade tip. The relatively lower radius ratio (0.25-0.3) design could achieve higher airflow with reduced fan diameter. It also helps to increase the amount of core flow of the engine and therefore decreases bypass ratio.

Figure 3:
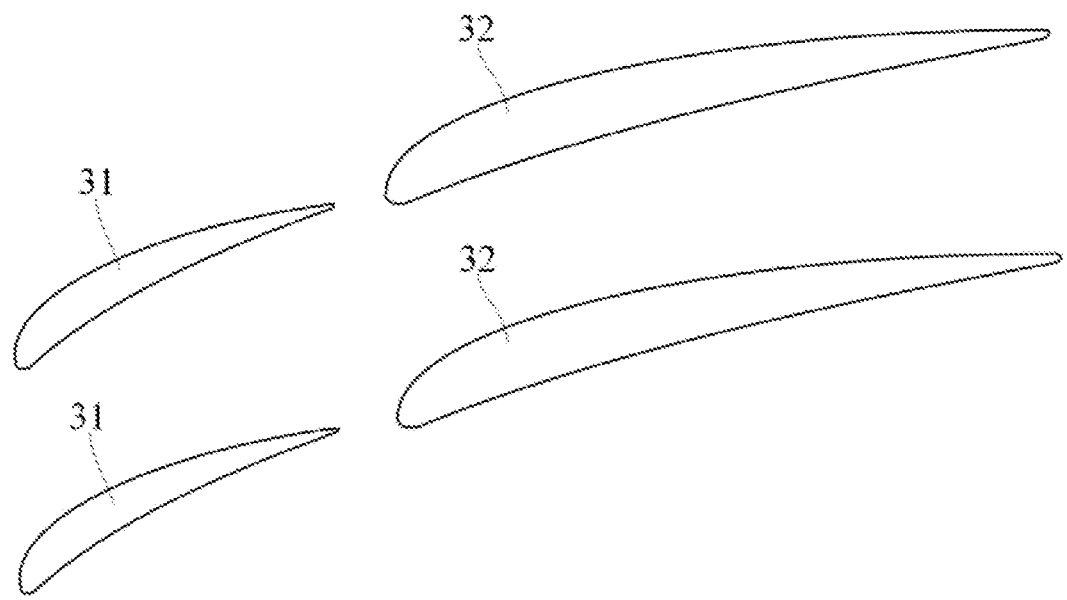
FIG. 3 is a schematic illustration of the spinner blade and main blade in prior art.

FIG. 3 schematically illustrates the setting pattern of main blades 32 and spinner blade 31 in prior art, where main blades 32 are in line with spinner blades 31. Specifically, the leading edge of the main blade 32 is close to the trailing edge of the spinner blade 31. Working fluid flows from the trailing edge of the spinner blade 31 to the leading edge of the main blade 32.

In embodiments of the invention, the setting pattern of main blades and spinner blades is different from the aforementioned prior art. As shown in FIG. 2, each spinner blade 22 is circumferentially offset to a corresponding main blade 21; the offset amount is marked by C. Not limited by current theories, the inventor of the invention found such an offset of the main blade 21 and the spinner blade 22 allows crossflow which can result in improved aerodynamic performance by energizing the boundary layer on the main blade 21.

The offset amount will be measured by the method described below, as shown in FIG. 2, the distance of two neighboring main blades is marked by D. In embodiments of the invention, setting the range 0<C/D≤0.05. Particularly, setting C/D to 0.01-0.02 could achieve best aerodynamic performance of main blade.

In embodiments of the invention, as shown in FIG. 2, the axial chord of main blade 21 is marked by B, while the axial chord of spinner blade 22 is marked by A, setting A/B to 0.05-0.2. Particularly, setting A/B to 0.08-0.12 could achieve best aerodynamic performance of main blade.

In another embodiment of the invention, the turbofan engine's compressor comprises a spinner blisk and spinner blades belonging to the spinner blisk. The plurality of main blades 42 are mounted on a fan disk 47, the fan disk is mounted on the rotor. The spinner blisk and the fan disk are connected by bolts via flange 45. The fan spinner 46 is connected to the spinner blisk (41, 43) by bolt 44 which located in front of the spinner blisk (41, 43).

Figure 4:
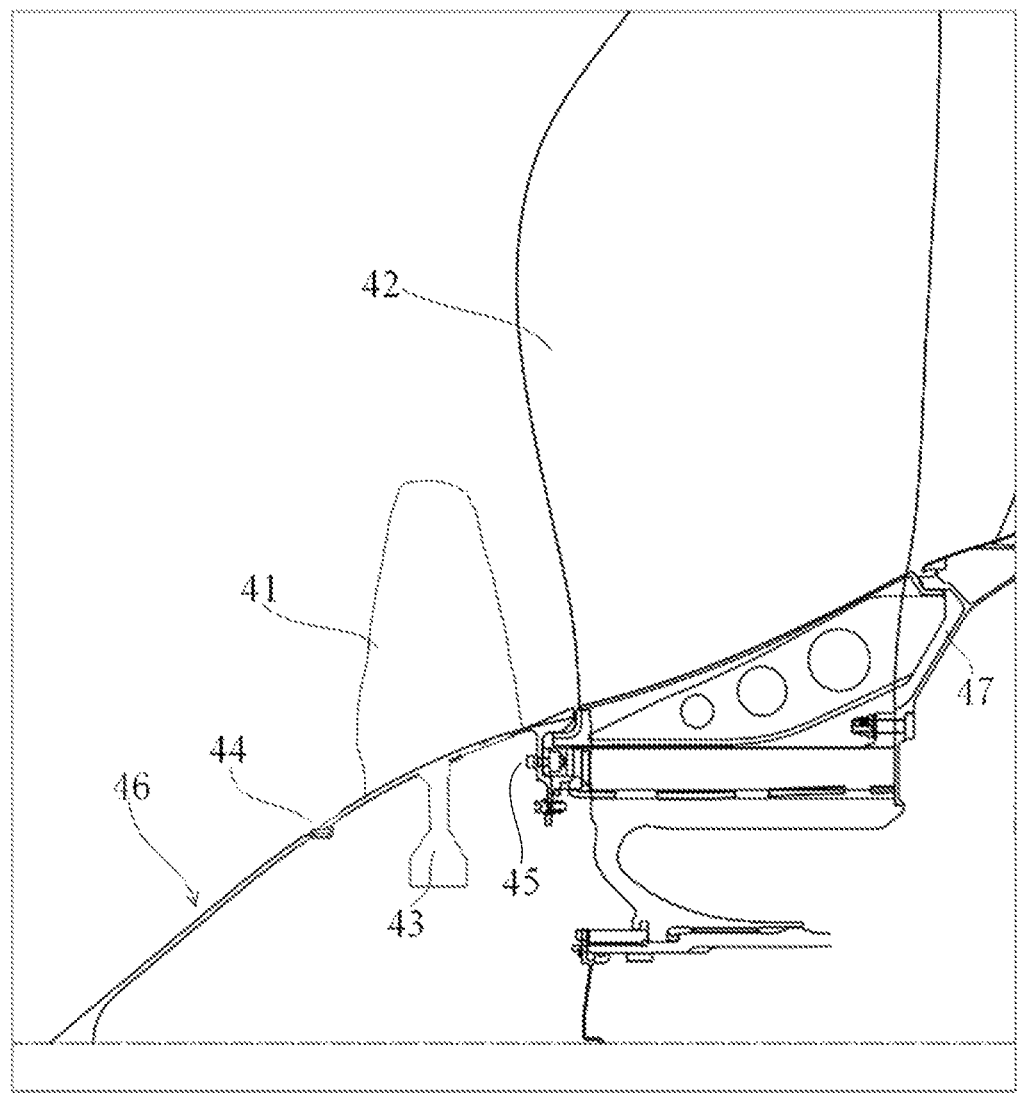
FIG. 4 is a schematic illustration of spinner blade and main blade mounting on a compressor rotor according to one embodiment of the invention.

FIG. 4 schematically illustrates the spinner blisk (41, 43) and the fan disk 47, the spinner blisk and the fan blisk could alternatively be made of titanium alloy, or other suitable material This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A turbofan engine, comprising:
a compressor rotor;
a plurality of main blades circumferentially mounted on the compressor rotor; and
a plurality of spinner blades circumferentially mounted on the compressor rotor,
wherein the plurality of spinner blades are located forward of leading edges of the plurality of main blades, and
wherein each of the plurality of spinner blades is circumferentially offset to a corresponding one of the plurality of main blades, and
wherein a chord ratio of a chord of at least one of the plurality of spinner blades to a chord of at least one of the plurality of main blades is 0.05-0.2.

2. The turbofan engine of claim 1, wherein the chord ratio is 0.08-0.12.

3. The turbofan engine of claim 1,
wherein a radius ratio of at least one of the plurality of main blades, defined as a ratio between a radius at a hub leading edge to a radius at a blade tip, is 0.25-0.3.

4. The turbofan engine of claim 1, wherein a distance ratio of an offset distance between the each of the plurality of spinner blades and the corresponding one of the plurality of main blades to a distance between two neighboring main blades of the plurality of main blades is less than or equal to 0.05.

5. The turbofan engine of claim 4, wherein the distance ratio is 0.01-0.02.

6. The turbofan engine of claim 1,
wherein the plurality of spinner blades are attached to a spinner blisk, and
wherein the spinner blisk is mounted on the compressor rotor.

7. The turbofan engine of claim 6,
wherein the plurality of main blades are mounted on a fan disk, and
wherein the fan disk is mounted on the compressor rotor.

8. The turbofan engine of claim 7, wherein the spinner blisk and the fan disk are connected by bolts via flange.

9. The turbofan engine of claim 6, wherein the spinner blisk is made of a titanium alloy.

10. The turbofan engine of claim 1, wherein the spinner blades are substantially triangular in shape in the cross-sectional view.

11. A method for setting a turbofan engine's blade, comprising:
circumferentially mounting a plurality of main blades on a compressor rotor;
circumferentially mounting a plurality of spinner blades on the compressor rotor; and
setting a chord ratio of a chord of at least one of the plurality of spinner blades to a chord of at least one of the main blades to be 0.05-0.2,
wherein the plurality of spinner blades are located forward of leading edges of the plurality of main blades,
wherein the plurality of main blades and the plurality of spinner blades are circumferentially offset to one another.

12. The method of claim 11, further comprising:
setting the chord ratio to be 0.08-0.12.

13. The method of claim 11, further comprising:
setting a radius ratio of at least one of the main blades, defined as a ratio between a radius at a hub leading edge to a radius at a blade tip, to be 0.25-0.3.

14. The method of claim 11, further comprising:
setting a distance ratio of an offset distance between the each of the plurality of spinner blades and the corresponding one of the plurality of main blades to a distance between two neighboring main blades of the plurality of main blades to be less than or equal to 0.05.

15. The method of claim 14, further comprising:
setting the distance ratio to be 0.01-0.02.

16. The method of claim 11, further comprising:
mounting a spinner blisk on the compressor rotor,
wherein the plurality of spinner blades are a part of the spinner blisk.

17. The method of claim 16, further comprising:
mounting a fan disk on the compressor rotor, and
mounting the plurality of main blades on the fan disk.

18. The method of claim 17, further comprising:
connecting the spinner blisk and the fan disk by bolts via flange.

* * * * *